United States Patent

Kim et al.

Patent Number: 5,821,439
Date of Patent: Oct. 13, 1998

[54] APPARATUS AND METHOD FOR MEASURING A DIMENSION OF A MANUFACTURED ARTICLE

[75] Inventors: Jong Geon Kim; Sung Cheol Huh, both of Changwon; Man Hyung Lee, Pusan, all of Rep. of Korea

[73] Assignee: Samsung Heavy Industries Co., Ltd., Rep. of Korea

[21] Appl. No.: 891,192

[22] Filed: Jul. 10, 1997

[30] Foreign Application Priority Data

Oct. 25, 1996 [KR] Rep. of Korea .................. 1996-48696

[51] Int. Cl.⁶ ..................................................... G01B 5/00
[52] U.S. Cl. ........................................................ 73/865.8
[58] Field of Search .............................. 33/783, 784, 787, 33/806, 501.02, 501.03, 572; 73/865.8, 866.5; 324/699, 716; 451/8; 356/384, 387, 385

[56] References Cited

U.S. PATENT DOCUMENTS

| | | | |
|---|---|---|---|
| 4,226,024 | 10/1980 | Westerberg et al. | 33/783 |
| 5,177,875 | 1/1993 | Pienta | 33/783 |
| 5,437,445 | 8/1995 | Chang et al. | 33/18 |
| 5,551,906 | 9/1996 | Helgren | 451/8 |

FOREIGN PATENT DOCUMENTS 361038866 2/1986 Japan ......................................... 451/8

*Primary Examiner*—Robert Raevis
*Attorney, Agent, or Firm*—Harness, Dickey & Pierce, P.L.C.

[57] ABSTRACT

Disclosed is an apparatus for measuring a dimension of a manufactured article to be worked on a cylindrical grinding machine. The apparatus includes non contact-type measuring sensors capable of measuring the outer diameter and cylindricity of the manufactured article while the manufactured article is mounted on the cylindrical grinding machine. The apparatus comprises a main body which is positioned above a cylindrical grinding machine. The main body includes a bed having a through opening formed through a center thereof and a plurality of support members for supporting the bed. A sensor attachment of the apparatus is positioned on the bed. A sensor attachment includes at least two pairs of non contact-type measuring sensors. The pairs of non contact-type measuring sensors are spaced opposite from each other in order to measure the outer diameter and cylindricity of the manufactured article. A feed mechanism of the apparatus moves the sensor attachment to a predetermined position for measuring the dimension of the manufactured article. A control panel of the apparatus controls the positioning and the operational signal of the feed mechanism. A master controller of the apparatus processes the measured data transmitted from the non contact-type measuring sensors.

11 Claims, 4 Drawing Sheets

APPARATUS AND METHOD FOR MEASURING A DIMENSION OF A MANUFACTURED ARTICLE

BACKGROUND OF THE INVENTION

1. Field of the Invention

The present invention relates to an apparatus and a method for measuring a dimension of a manufactured article and, more particularly, to an apparatus and a method for measuring a dimension of a manufactured article to be worked on a cylindrical grinding machine. The apparatus having non contact-type measuring sensors capable of measuring the outer diameter and cylindricity of the manufactured article while the manufactured article is mounted on the cylindrical grinding machine.

2. Description of the Prior Art

Generally, it is preferable to perform a precision measurement of a manufactured article at the final stage of a cylindrical grinding machine operation. The precision measurement is performed by a variety of precision measuring devices, which are installed in a precision measuring room to minimize measuring interference factors. Accordingly, after transferring once the manufactured article is transferred to the precision measuring room, the manufactured article is cleaned and mounted in the measuring device. Thereafter, the precision measurement for the manufactured article is performed.

When a user performs a series of precision measurement operations according to the prior art, it will involve much time and great expense. In practice, the precision measurement may only be performed for several samples of the manufactured articles so as to minimize the adverse effect on productivity. Accordingly, a large number of inferior goods can be frequently produced.

If a manufactured article is excessively worked in order to obtain the necessary precision, the amount of time and energy required increases. In addition, the durability of the machine used for working the manufactured article may be reduced. Further, it is required to frequently perform measuring works during the working of the manufactured article.

Meanwhile, mostly in practices, of contamination may occur from by pollutants such as wasted cutting oil, wasted cooling water or worked chips. In addition, ear-splitting noise and serious vibration can be generated during the working of the manufactured article. Accordingly, the practical operation areas are not adapted to perform the precision measurement.

According to the prior art, special equipment employing a mechanical principle, an electronic principle, an optical principle or pressurized air are used to measure the cylindricity of a manufactured article, causing inconvenience in using the special equipment. Similarly, contact-type measuring apparatus have the disadvantage of measuring errors due to contact force and wear in a sensor head.

SUMMARY OF THE INVENTION

The present invention is contrived to solve the foregoing problems. It is an object of the present invention to provide an apparatus for measuring a dimension of a manufactured article to be worked on a cylindrical grinding machine, having non contact-type measuring sensors capable of measuring an outer diameter of the manufactured article under the state where the manufactured article is mounted on the cylindrical grinding machine.

It is another object of the present invention to provide an apparatus for measuring a dimension of a manufactured article to be worked on a cylindrical grinding machine, having non contact-type measuring sensors capable of measuring a cylindricity of the manufactured article without additional measuring equipment.

It is still another object of the present invention to provide an apparatus for measuring a dimension of a manufactured article to be worked on a cylindrical grinding machine, having non contact-type measuring sensors capable of effectively removing measuring noises.

It is another object of the present invention to provide an apparatus for simultaneously measuring a dimension of a manufactured article to be worked on a cylindrical grinding machine, having non contact-type measuring sensors capable of measuring an outer diameter of the manufactured article with a variety of sizes at a plurality of measuring points.

In order to achieve the above objects, the present invention provides an apparatus for measuring a dimension of a manufactured article comprising:

a main body being positioned above a cylindrical grinding machine, the main body including a bed having a through opening formed through a center thereof and a plurality of support members for supporting the bed;

a sensor attachment being positioned on the bed, the sensor attachment including at least two pairs of non contact-type measuring sensors, in which the pairs of non contact-type measuring sensors are spaced and opposite to each other in order to measure an outer diameter and a cylindricity of the manufactured article;

a feed mechanism for transferring the sensor attachment to a predetermined position for measuring the dimension of the manufactured article;

a control panel for controlling a positioning and an operation signal of the feed mechanism; and a master controller for processing a measured data transmitted from the non contact-type measuring sensors.

The non contact-type measuring sensors are positioned on front ends of at least two cylinders capable of moving toward or away from the manufactured article.

The feed mechanism includes a first feed device for making move the sensor attachment through the through opening in the vertical direction in regard to the manufactured article in order to measure the outer diameter of the manufactured article, and a second feed device making move the sensor attachment in the horizontal direction in regard to the manufactured article in order to measure the cylindricity of the manufactured article.

Preferably, the non contact-type measuring sensors comprise a vortical current sensors.

The apparatus for measuring the dimension of the manufactured article further comprises an extended Kalman filter for processing a measured data having noises which is measured by the non contact-type measuring sensors in order to judge the dimension and a shape of the manufactured article. Further, the apparatus further comprises a median filter for removing noises included in a measured data which is measured by the non contact-type measuring sensors. The median filter is used according to the moving average method.

BRIEF DESCRIPTION OF THE DRAWINGS

The above object and other characteristics and advantages of the present invention will become more apparent by describing in detail a preferred embodiment thereof with reference to the attached drawings, in which.

DETAILED DESCRIPTION OF THE INVENTION

Hereinafter, the preferred embodiment of the present invention will be explained in more detail with reference to the accompanying drawings.

Figure 1:
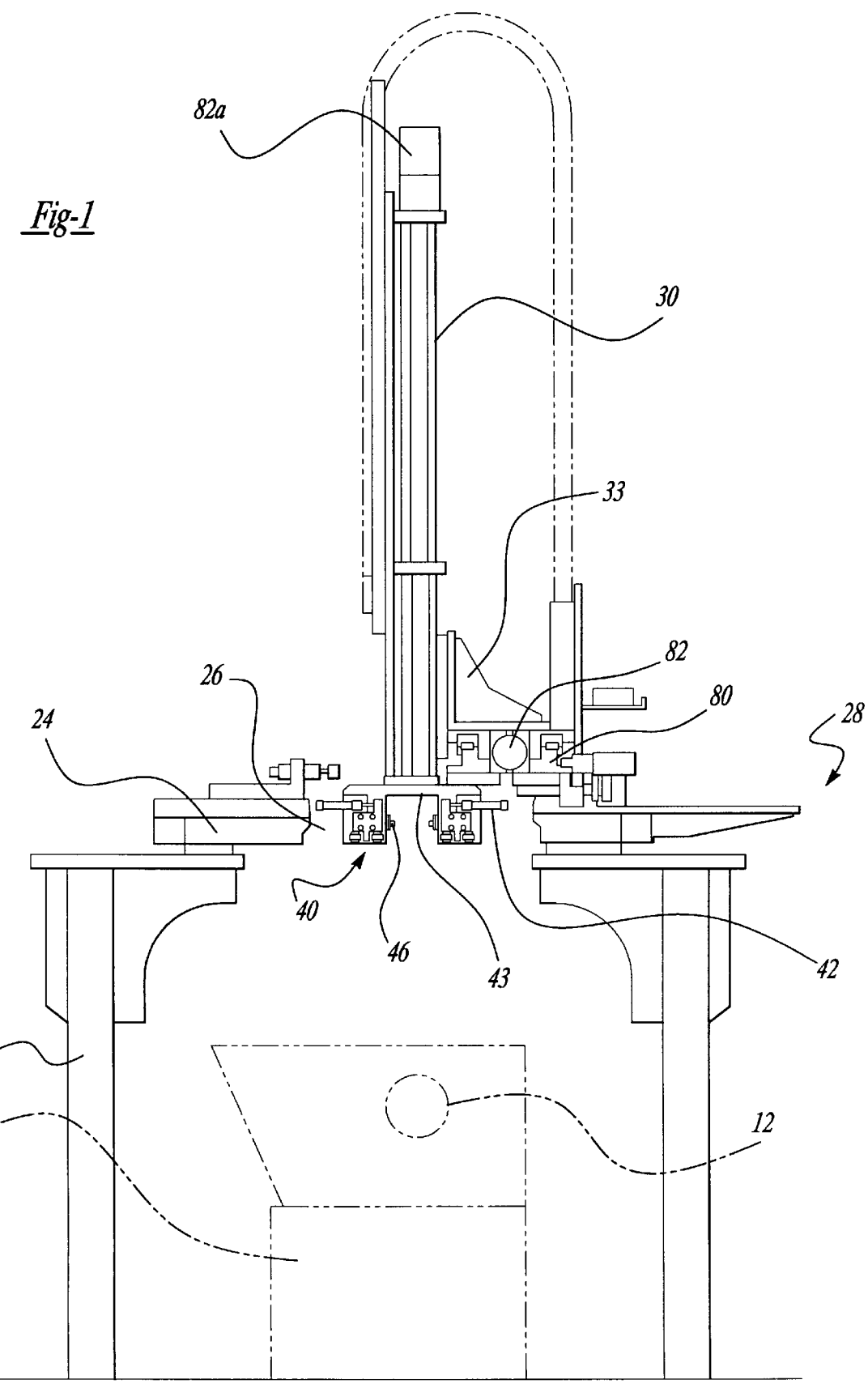
FIG. 1 is a side view of an apparatus for measuring a dimension of a manufactured article according to a preferred embodiment of the present invention, showing a plurality of non contact-type sensors incorporated in the apparatus.

FIG. 1 is a side view of an apparatus for measuring a dimension of a manufactured article according to a preferred embodiment of the present invention, showing a plurality of non contact-type sensors incorporated in the apparatus.

Referring to FIG. 1, a manufactured article 12 is positioned on a cylindrical grinding machine 10. The apparatus for measuring the dimension of the manufactured article 12 according to the preferred embodiment of the present invention is positioned above the manufactured article 12. A main body 28 of the apparatus for measuring the dimension of the manufactured article 12 includes a bed 24 and a plurality of support members 22 for supporting the bed 24. The bed 24 has a through opening 26 which is formed through a center thereof.

A sensor attachment 40 of the apparatus for measuring the dimension of the manufactured article 12 is movably disposed in the through opening 26 so that the sensor attachment 40 can pass through the through opening 26 upwardly and downwardly. A first feed mechanism 30 for transferring the sensor attachment 40 in the vertical direction is connected with a connecting portion 43 of the sensor attachment 40. The first feed mechanism 30 includes a first driving motor 82a. The first feed mechanism 30 is installed on the bed 24.

Figure 2:
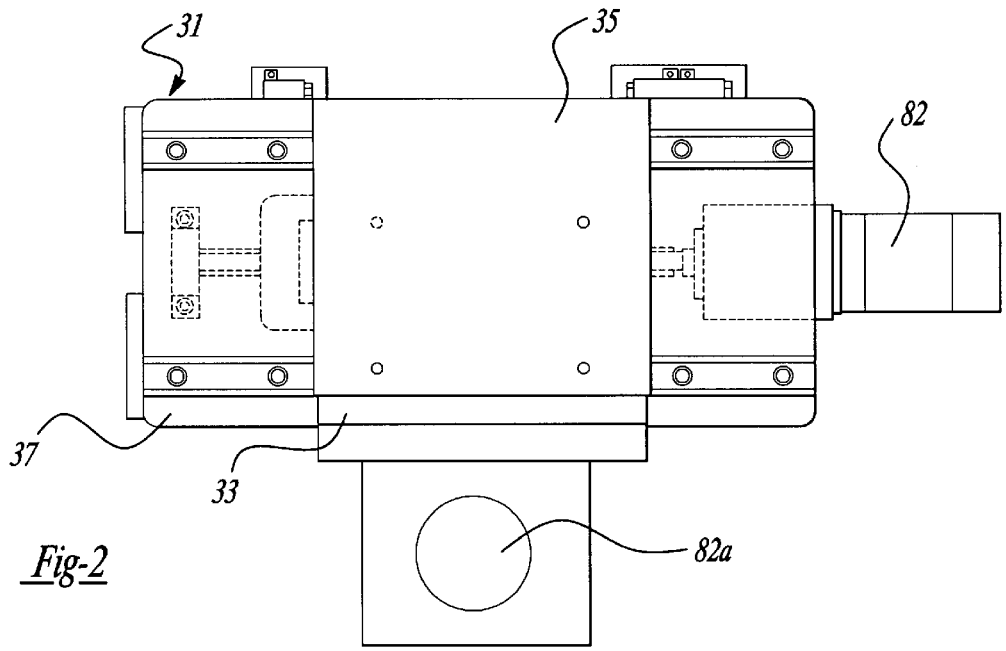
FIG. 2 is a plan view of a second feed mechanism for transferring a sensor attachment in the horizontal direction on a bed, which is incorporated in the apparatus for measuring the dimension of the manufactured article according to the preferred embodiment of the present invention.

The sensor attachment 40 is connected with a second feed mechanism 31 for transferring the sensor attachment 40 in the horizontal direction on the bed 24 (refer to FIG. 2). The second feed mechanism 31 includes a second driving motor 82. The first feed mechanism 30 and the second feed mechanism 31 are connected with each other through a bracket 33. The first feed mechanism 30 and the second feed mechanism 31 cross at right angles.

FIG. 2 illustrates the second feed attachment 31 for transferring the sensor attachment 40 in the horizontal direction on the bed 24. Referring to FIG. 2, a carriage 35 is mounted on a feed guide 37 so that the carriage 35 can be transported in the horizontal direction by the operation of the second driving motor 82.

Figure 3:
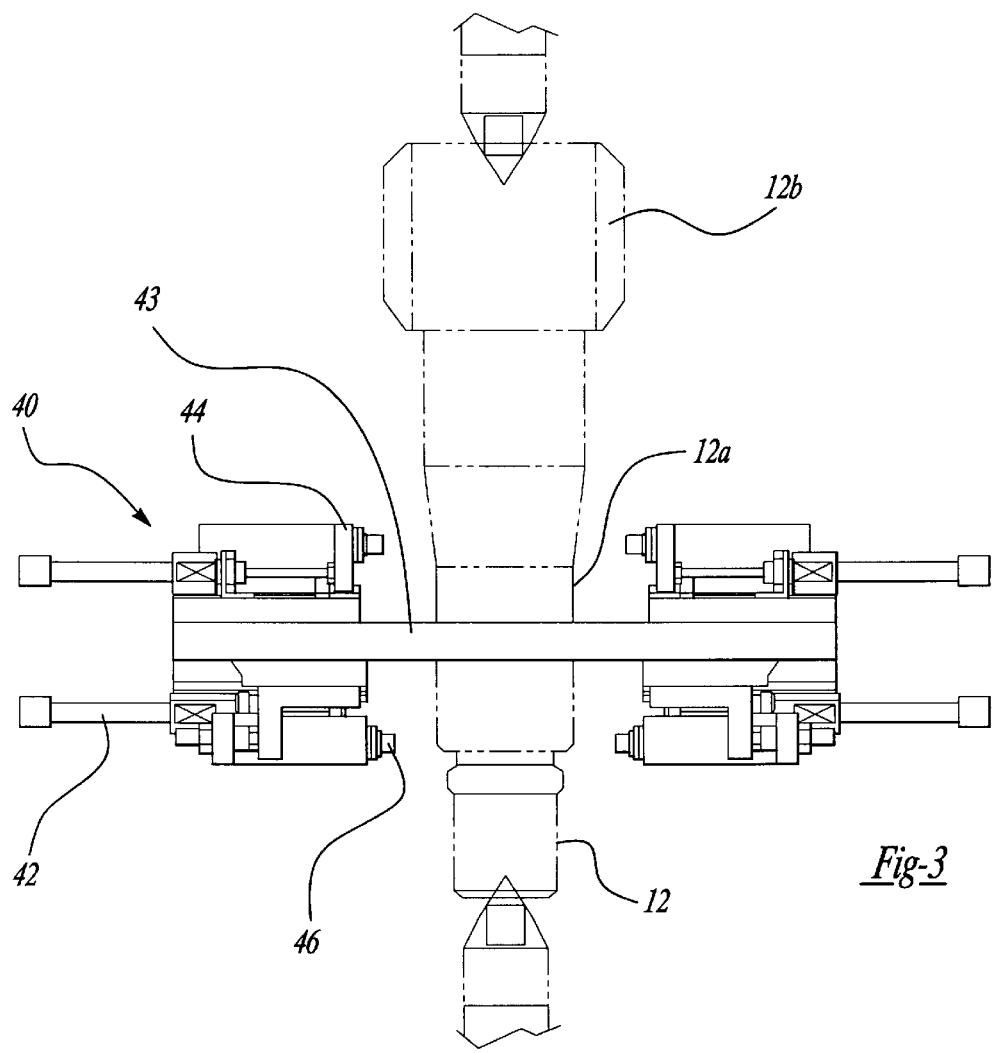
FIG. 3 is a plan view of the sensor attachment incorporated in the apparatus for measuring the dimension of the manufactured article according to the preferred embodiment of the present invention.
Figure 4:
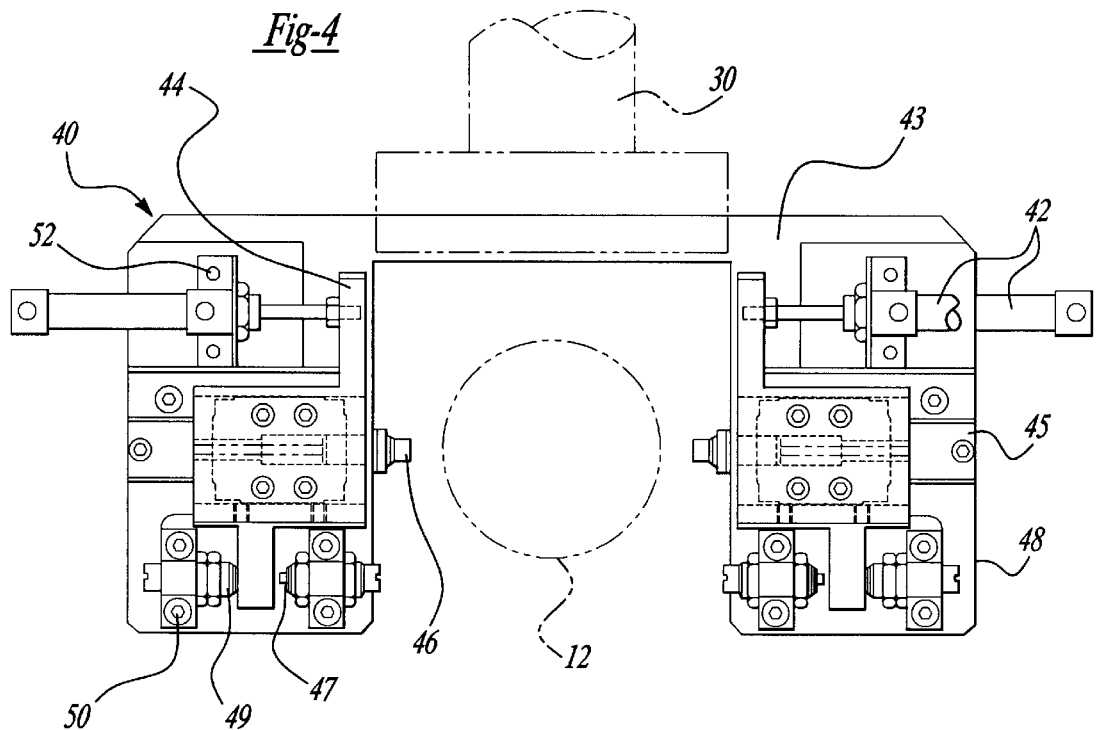
FIG. 4 is a side view of the sensor attachment incorporated in the apparatus for measuring the dimension of the manufactured article according to the preferred embodiment of the present invention.

FIG. 3 is a plan view of the sensor attachment 40 incorporated in the apparatus for measuring the dimension of the manufactured article according to the preferred embodiment of the present invention. FIG. 4 is a side view of the sensor attachment 40 incorporated in the apparatus for measuring the dimension of the manufactured article according to the preferred embodiment of the present invention.

Referring to FIGS. 3 and 4, at least a pair of cylinders 42 are installed to both sides of the manufactured article 12. The manufactured article 12 is positioned between the pairs of cylinders 42. The pairs of cylinders 42 are spaced and opposite to each other. The pairs of cylinders 42 move toward an outer surface of the manufactured article 12. A sensor head module 44 is connected with a front end of the cylinder 42. A sensor 46 is positioned at a front end of the sensor head module 44. The sensor 46 faces toward the manufactured article 12 and is positioned along the same axial line as the sensor head module 44. Preferably, the sensor 46 comprises a non contact-type vortical current sensor. The sensor head module 44 is slideably locked to a guide portion 45 which is installed to a frame 48 of the sensor attachment 40 (refer to FIG. 4). The sensor head module 44 can slide on the guide portion 45.

A forward stopper 47 and a backward stopper 49 are locked to one side of the frame 48 by using stopper locking bolts 50. The positions of the forward stopper 47 and the backward stopper 49 can be controlled by the stopper locking bolts 50 so that a forward stroke and a backward stroke of the cylinder 42 can be changed according to a size of the outer diameter of the manufactured article 12. In the same manner as the forward stopper 47 and the backward stopper 49, the cylinder 42 is locked to the other side of the frame 48 by using locking bolts 52. The position of the cylinder 42 can be changed according to a size of the outer diameter of the manufactured article 12. The cylinder 12 is operated by the aid of pneumatic pressure.

Figure 5:
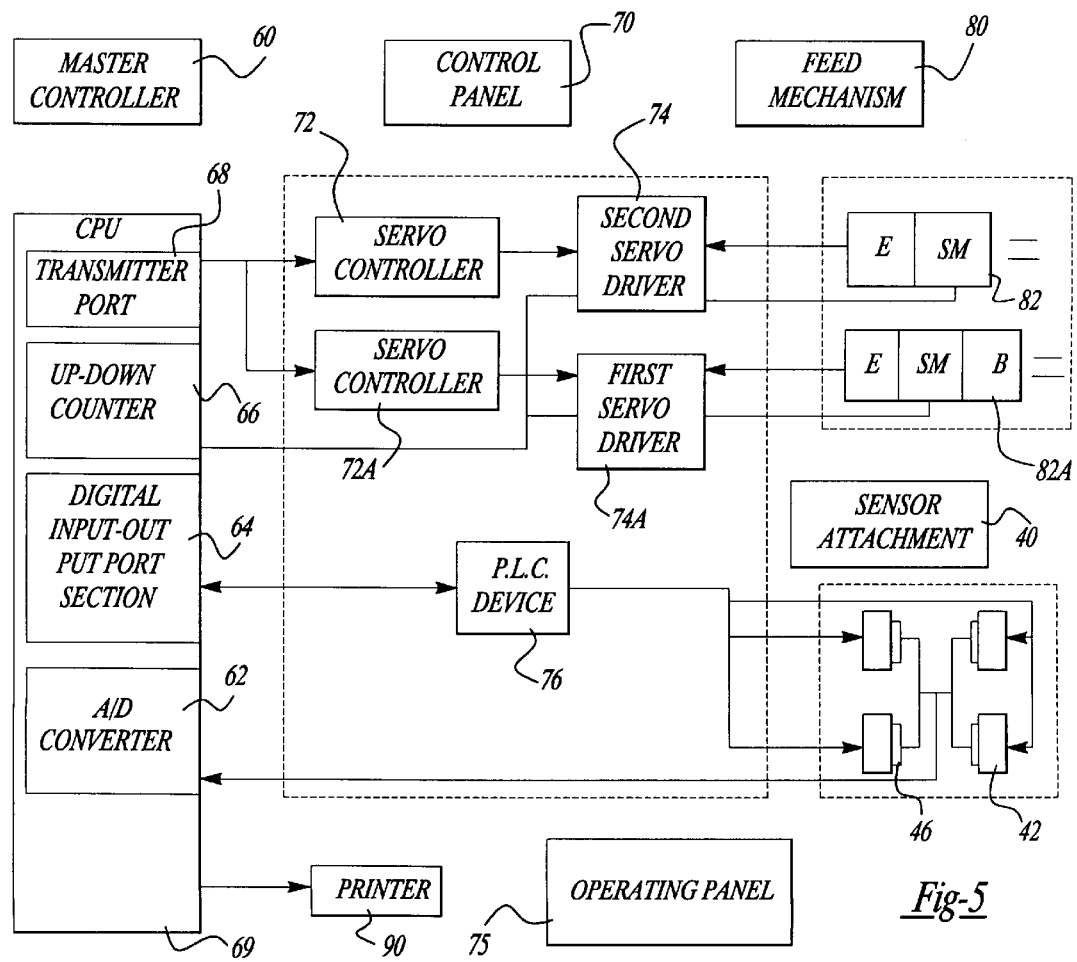
FIG. 5 is a schematic diagram of a control system of the apparatus for measuring the dimension of the manufactured article according to the preferred embodiment of the present invention.

Hereinbelow, a control system and an operating method of the apparatus for measuring the dimension of the manufactured article according to the preferred embodiment of the present invention will be described with reference to FIG. 5. The sensor attachment 40 includes at least two cylinders 42 for allowing the sensor 46 to move forward to or away from the manufactured article 12. A master controller 60 includes an A/D converter 62 converting analog signals generated from the sensor 46 into digital signals; a digital input-output port section 64 inputting or outputting the digital signals; an up-down counter 66 receiving an encoder signal in order to input a right-left position and an up-down position of the sensor attachment 40; a transmitter port 68 transmitting an order for positioning the sensor attachment 40 to servo controllers 72 and 72a for controlling a right-left position and an up-down position of the sensor attachment 40; and a central processing unit (hereinafter simply referred to as "CPU") 69 performing a measuring algorithm in relation to the A/D converter 62, the up-down counter 66 and the transmitter port 68, while controlling all the operations of the apparatus for measuring the dimension of the manufactured article.

A control panel 70 includes a first servo driver 74a, a second servo driver 74 and P.L.C. device 76. The first servo driver 74a drives the first servo driver 82a of a feed mechanism 80 by receiving a positioning order from the servo controller 72a. The second servo driver 74 drives the second servo driver 82 of the feed mechanism 80 by receiving a positioning order from the servo controller 72. The P.L.C. device 76 generates a control signal for controlling the movement of the cylinder 42 forward and backward, performs a logic control of the control system. A operating panel 75 is installed to one side of the control panel 70. The operating panel 75 can be operated according to a manual mode and an automatic mode. Meanwhile, the feed mechanism 80 includes the first servo driver 82a and the second servo driver 82.

Hereinbelow, an operating method of the apparatus for measuring the dimension of the manufactured article in the automatic mode will be explained.

If an origin return command in relation to the position of the cylinder 42 is transmitted to the transmitter port 68, whether the cylinder 42 must return to the origin or not is decided. Thereafter, the cylinder 42 is advanced. When the cylinder 42 advances toward the manufactured article 12, the sensor attachment 40 move downwards a measuring preparation position by using the transmitter port 68. Here, the measuring preparation position is an initial position for setting a zero point position of an encoder signal. The measuring preparation position is a position above the center of the manufactured article 12 by a distance of 10 mm.

When the sensor attachment 40 stops at the measuring preparation position, a counter value is set to zero and the sensor attachment 40 is transferred to a final measuring position. Here, the final measuring position is a position below the center of the manufactured article 12 by a distance of 10 mm.

Information sensed by the sensor 46 during the movement of the sensor attachment 40 downwards is transmitted to the master controller 60 via the A/D converter 62. The value of the up-down counter 66 corresponding to the vertical position of the sensor attachment 40 is transmitted to the master controller 60 via the digital input-output port 64. Sensors 46 have measuring noises which are evenly distributed in most frequency bands. Accordingly, it is impossible to remove the measuring noises using a conventional noise removing filter for a specific frequency band. Therefore, in the present invention, a system parameter estimation concept is employed to remove the measuring noises. The system parameter estimation concept now removes the noises from the signal. The system parameter estimation concept is an algorithm capable of assuming one of the state variables of the system.

Further, in the present invention, a system equation and a measurement equation are non-linear type equations. Accordingly, an extended Kalman filter for a non-linear system is employed. The linearization of the data is accomplished at every step in relation to a state vector path, which is assumed by the extended Kalman filter.

According to the measuring method as described above, a mechanical vibration which is generated during the transfer of the sensor in a measuring direction can be removed. In addition, in order to remove noises included in the data which is measured by the sensor, a median filter can be used for filtering. The median filter is used according to the moving average method.

When a user wants to measure a cylindricity of the manufactured article, the user can obtain data by moving the feed mechanism in the horizontal direction while the manufactured article rotates.

It is possible to perform the indirect measurement above using only one sensor. However, two sensors provide improved measuring precision over the single sensor method.

Figure 6:
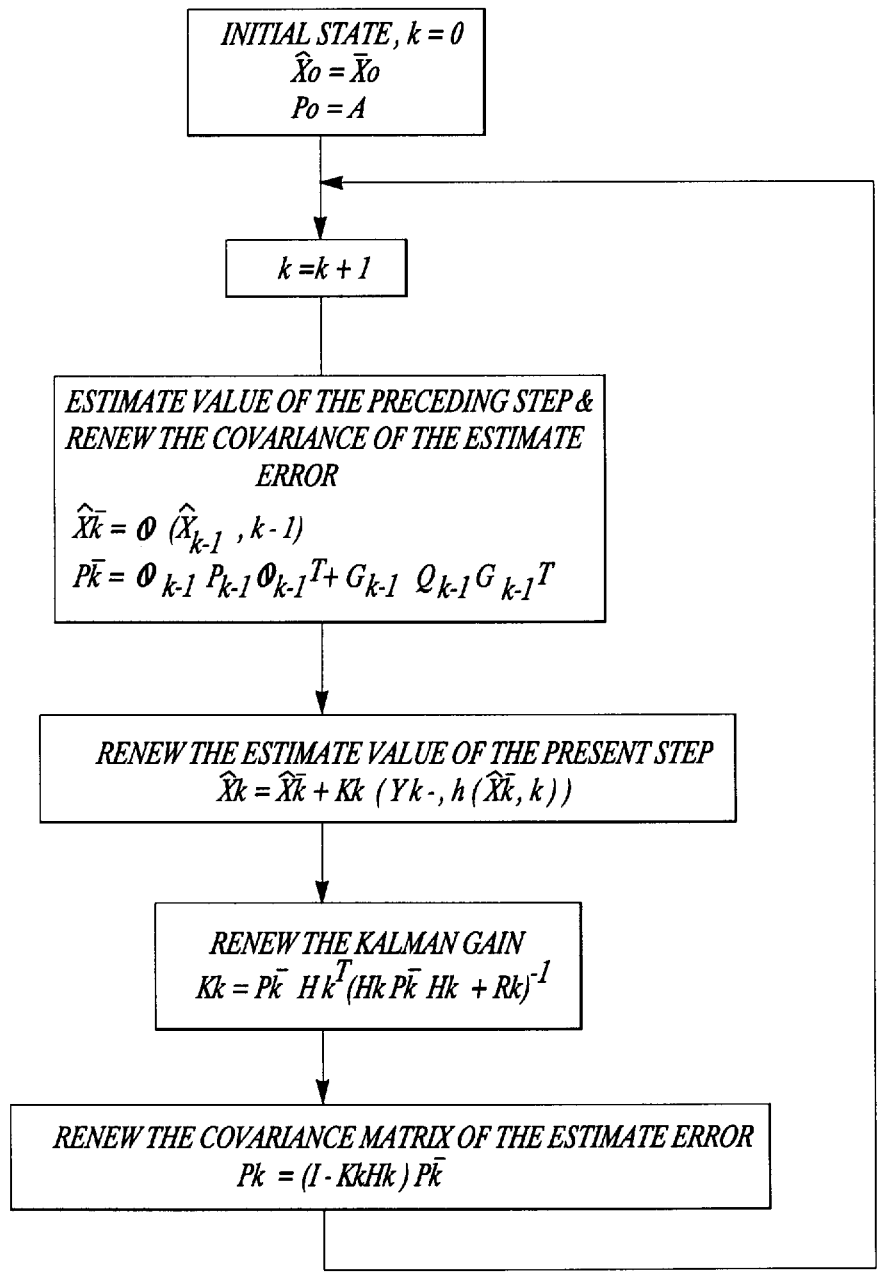
FIG. 6 is a flow chart of an algorithm for removing measuring noises, which is applied to the apparatus for measuring the dimension of the manufactured article according to the preferred embodiment of the present invention.

FIG. 6 is a flow chart of an algorithm for removing measuring noises, which is employed in the apparatus for measuring the dimension of the manufactured article according to the preferred embodiment of the present invention. In FIG. 6, the reference symbols represent predetermined variables as follow:

$c_o = c_o$: initial state value;

$P_o = 1$: covariance matrix of an estimate error for an initial state;

$c_k \pounds$: predicted estimate value of a k-step obtained from a value measured up to a k-1 step;

$P_k \pounds$: covariance matrix of a predicted estimate error;

$K_k$: Kalman gain;

$c_k$: predicted estimate value of a k-step obtained from a value measured up to the k step; and $P_k$: covariance matrix of an estimate error.

The value of k is zero at an initial state and is increased by one at each subsequent step. An estimate value and the covariance matrix of the estimate error for the preceding step are renewed on the basis of an initial value and an estimate error of the initial state. Then, a state estimate value, the Kalman gain and the covariance matrix of the estimate error are renewed, respectively. Once this step is completed, a step for updating the estimate value and the covariance matrix of the estimate error for the preceding step is performed.

The apparatus for measuring the dimension of the manufactured article according to the preferred embodiment of the present invention can be applied to a variety of machines.

As described above, in the apparatus for measuring the dimension of the manufactured article which has non contact-type measuring sensors, it is possible to enhance productivity by measuring the outer diameter of the manufactured article while the manufactured article is mounted on the cylindrical grinding machine.

Further, the apparatus can precisely measure the outer diameter of the manufactured article and can effectively remove the measuring noises included in the data measured, by using only the extended Kalman filter, thereby reducing the number of defective manufactured articles. In addition, the apparatus can measure the cylindricity of the manufactured article without any additional measuring devices.

The apparatus can further measure the outer diameter of the manufactured article having a variety of sizes by using a plurality of sensors at a plurality of measuring points.

Since the apparatus can further measure the outer diameter and the cylindricity of the manufactured article without contacting the manufactured article, it is possible to remove the measuring errors due to the measuring force and the wear of the sensor head.

While the present invention has been particularly shown and described with reference to a particular embodiment thereof, it will be understood by those skilled in the art that various changes in form and detail may be effected therein without departing from the spirit and scope of the invention as defined by the appended claims.

What is claimed is:

1. An apparatus for measuring a dimension of a manufactured article using non-contact type sensor comprising:

a main body being positioned above a cylindrical grinding machine, said main body including a bed having a through opening formed through a center thereof and a plurality of support members for supporting said bed;

a sensor attachment being positioned on said bed, said sensor attachment including at least two pairs of non contact-type measuring sensors, said pairs of non contact-type measuring sensors being spaced opposite to each other to measure an outer diameter and a cylindricity of the manufactured article;

a feed mechanism for transferring said sensor attachment to a predetermined position for measuring the dimension of the manufactured article;

a control panel for controlling a positioning and an operation signal of said feed mechanism; and a master controller for processing a measured data transmitted from said non contact-type measuring sensors.

2. The apparatus for measuring a dimension of a manufactured article as claimed in claim 1, wherein said non contact-type measuring sensors are positioned on front ends of at least two cylinders capable of moving toward or away from the manufactured article.

3. The apparatus for measuring a dimension of a manufactured article as claimed in claim 1, wherein said feed mechanism includes a first feed device for moving said sensor attachment vertically through said through opening to measure the outer diameter of the manufactured article, and a second feed device moving said sensor attachment in the horizontal direction to measure the cylindricity of the manufactured article.

4. The apparatus for measuring a dimension of a manufactured article as claimed in claim 1, wherein said non contact-type measuring sensors comprise a vortical current sensors.

5. The apparatus for measuring a dimension of a manufactured article as claimed in claim 1, further comprising an extended Kalman filter for processing a measured data having noises which is measured by said non contact-type measuring sensors in order to judge the dimension and a shape of the manufactured article.

6. The apparatus for measuring a dimension of a manufactured article as claimed in claim 1, further comprising a median filter for removing noises included in a measured data which is measured by said non contact-type measuring sensors, said median filter being used according to the moving average method.

7. The apparatus for measuring a dimension of a manufactured article as claimed in claim 1, wherein said control panel comprising a first servo driver receiving a signal from a servo controller which controls the left-right and the toward-backward position to drive the left-right driving motor of the feed mechanism, a second servo driver for driving up-down driving motor of the feed mechanism, and a PLC carrying out the system logic control while controlling the forward-backward movement of a cylinder.

8. The apparatus for measuring a dimension of a manufactured article as claimed in claim 1, wherein said master controller comprising an A/D converter converting analog signals generated from the sensor into digital signals; a digital input-output port section receiving or transmitting the digital signals; an up-down counter receiving an encoder signal in order to input a right-left position and an up-down position of the sensor attachment; a transmitter port transmitting a signal for positioning the sensor attachment to servo controllers which control a right-left position and an up-down position of the sensor attachment; and a central processing unit performing a measuring algorithm in relation to the A/D converter, the up-down counter and the transmitter port, while controlling all the operations of the apparatus for measuring the dimension of the manufactured article.

9. A method for measuring a dimension of a manufactured article using non-contact type sensor, said method comprising the steps of:

moving a sensor attachment to a measuring preparation position;

setting a counter to an initial value;

obtaining measurement data while transferring said sensor attachment;

transmitting counter values of the position of said sensor attachment; and estimating one state variable of a system from said measurement data.

10. The method for measuring a dimension of a manufactured article as claimed in claim 9, wherein said estimating step involves processing with an extended Kalman filter.

11. The method for measuring a dimension of a manufactured article as claimed in claim 9, wherein said estimating step involves processing with a median filter and a moving average method.

* * * * *